US012691836B2

(12) United States Patent
    Alkhoury

(10) Patent No.: US 12,691,836 B2
(45) Date of Patent: Jul. 28, 2026

(54) VEHICLE DEVICE HAVING A BASE VEHICLE AND A SEAT UNIT

(71) Applicant: AUTOLIV DEVELOPMENT AB, Vargarda (SE)

(72) Inventor: Ziad Alkhoury, Cergy (FR)

(73) Assignee: Autoliv Development AB, Vargarda (SE)

( * ) Notice: Subject to any disclaimer, the term of this patent is extended or adjusted under 35 U.S.C. 154(b) by 70 days.

(21) Appl. No.: 18/576,289

(22) PCT Filed: Jul. 5, 2022

(86) PCT No.: PCT/EP2022/068543

§ 371 (c)(1),
(2) Date: Jan. 3, 2024

(87) PCT Pub. No.: WO2023/280827

PCT Pub. Date: Jan. 12, 2023

(65) Prior Publication Data

US 2024/0317159 A1     Sep. 26, 2024

(30) Foreign Application Priority Data

Jul. 6, 2021    (DE) ..................... 10 2021 117 452.2

(51) Int. Cl.
B60R 16/023        (2006.01)
B60N 2/00          (2006.01)
(Continued)

(52) U.S. Cl.
CPC ............ *B60R 16/023* (2013.01); *B60N 2/003* (2023.08); *B60N 2/005* (2013.01); *B60R 16/033* (2013.01);
(Continued)

(58) Field of Classification Search
CPC ................ B60R 16/023; B60R 16/033; B60R 21/01546; B60R 21/01554; B60N 2/003;
(Continued)

(56) References Cited

U.S. PATENT DOCUMENTS 4,958,381 A * 9/1990 Toyoshima ............ H04N 7/173
9,443,411 B2 * 9/2016 Schoenberg ...... B60R 21/01556
(Continued)

FOREIGN PATENT DOCUMENTS

DE      102007060317 A1 * 11/2008   ....... B60R 21/01546
DE      102020203537 A1    10/2020
(Continued)

*Primary Examiner* — Ellis B. Ramirez
(74) *Attorney, Agent, or Firm* — Dickinson Wright PLLC

(57)          ABSTRACT

A vehicle device comprising a base vehicle and a seat unit being releasably connectable to the base vehicle is described. The base vehicle comprises an electronic control means and a vehicle-side wireless communication means, and the seat unit comprises at least one sensor, a battery, an electronic unit, and a seat-side wireless communication means. In order to provide the electronic control means of the base vehicle with the necessary information about the seat unit in an energy-saving manner, the electronic unit reads-out the status of the at least one sensor in a certain time-scheme and transmits a sensor related signal via the seat-side wireless communications means only if the status of the sensor changed since the previous read-out.

11 Claims, 3 Drawing Sheets

Figure 3:
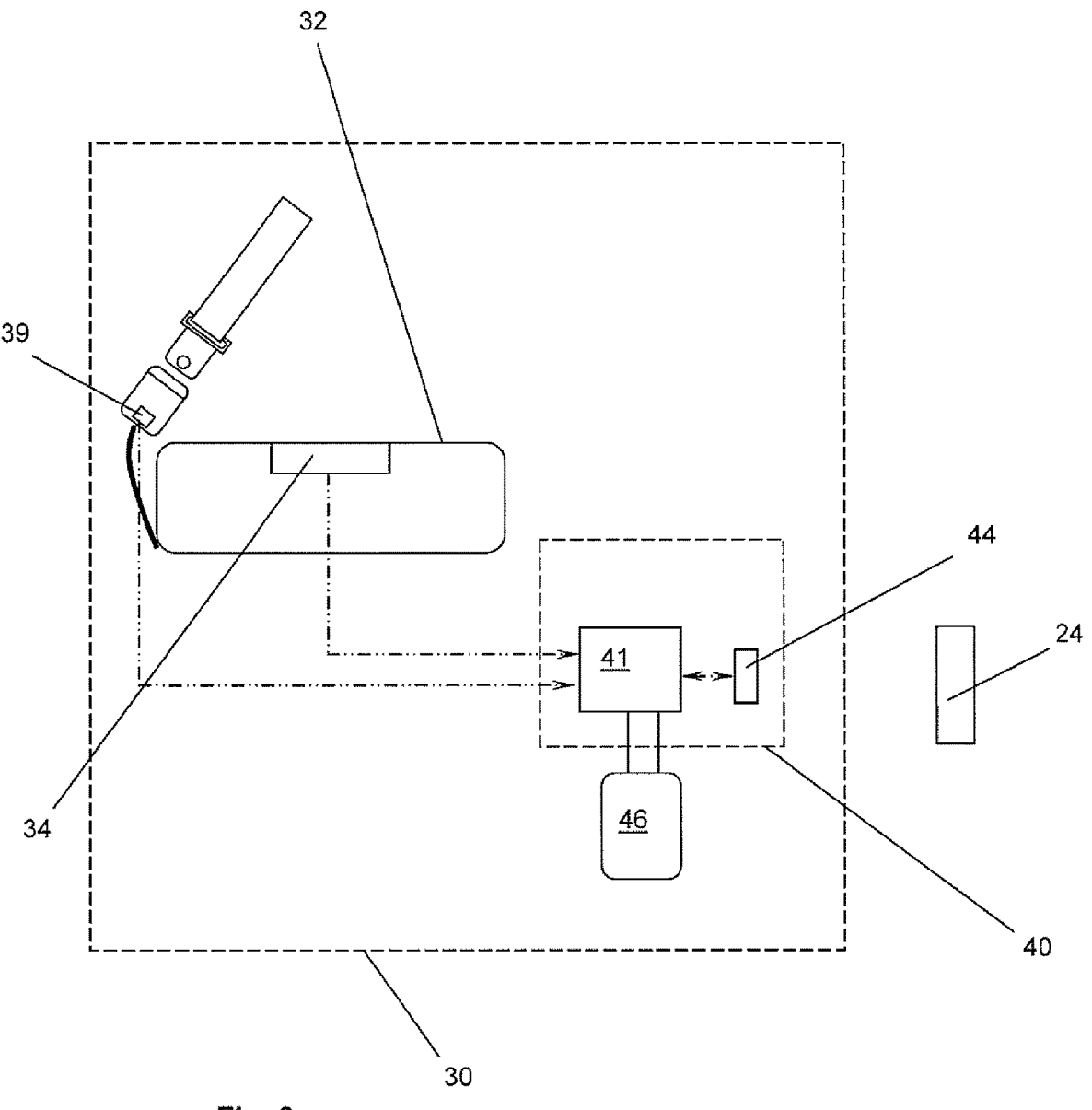

(51) Int. Cl.
    *B60N 2/005*           (2006.01)
    *B60R 16/033*        (2006.01)
    *H04Q 9/02*           (2006.01)

(52) U.S. Cl.
    CPC ........... *H04Q 9/02* (2013.01); *B60N 2230/20*
        (2023.08); *H04Q 2209/883* (2013.01)

(58) Field of Classification Search
    CPC ...... B60N 2/005; B60N 2230/20; H04Q 9/02;
        H04Q 2209/883; H04W 4/48; H04W 4/38
    USPC ........... 701/32.7, 32.8, 34.4; 340/447, 457.1,
        340/425.5, 686.1; 280/735; 705/5;
        710/46, 220; 297/217.2
    See application file for complete search history.

(56)         References Cited

U.S. PATENT DOCUMENTS

| | | | |
|---|---|---|---|
| 2003/0098792 | A1 | 5/2003 | Edwards et al. |
| 2004/0160320 | A1* | 8/2004 | Edwards .......... B60R 21/01556 |
| 2006/0100002 | A1 | 5/2006 | Luebke et al. |
| 2009/0058057 | A1* | 3/2009 | Ghabra ............. B60R 21/01546 |
| 2010/0283593 | A1* | 11/2010 | Miller ................. B60C 23/0408 |
| 2013/0128786 | A1 | 5/2013 | Sultan et al. |
| 2016/0121848 | A1* | 5/2016 | Seibert ................. B60N 2/2816 |
| 2017/0080826 | A1* | 3/2017 | Bonk ....................... B60N 2/06 |
| 2017/0215143 | A1 | 7/2017 | Fiennes |
| 2019/0232909 | A1* | 8/2019 | Lamesch ........... B60R 21/01546 |
| 2020/0017068 | A1 | 1/2020 | Moffa et al. |
| 2020/0047666 | A1 | 2/2020 | Moffa |
| 2020/0229094 | A1 | 7/2020 | Fiennes |
| 2020/0331373 | A1 | 10/2020 | Hiramatsu |
| 2020/0369180 | A1* | 11/2020 | Suzuki ..................... B60N 2/06 |
| 2020/0369225 | A1 | 11/2020 | Kominato |
| 2021/0101562 | A1* | 4/2021 | Ricart ................. H01Q 1/3291 |

FOREIGN PATENT DOCUMENTS

| | | |
|---|---|---|
| JP | 2020-189597 A | 11/2020 |
| WO | 2009/022286 A2 | 2/2009 |

* cited by examiner

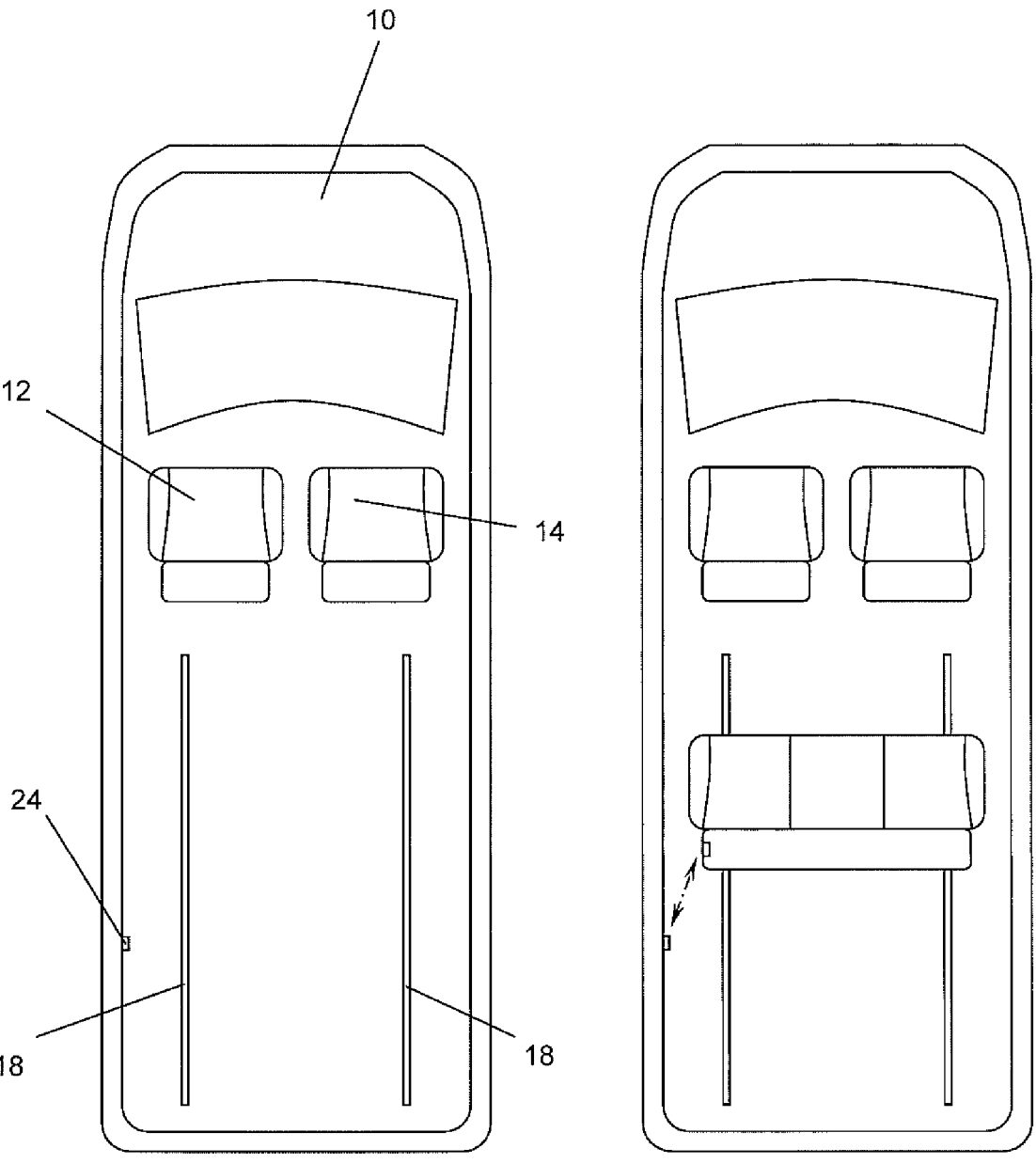
Fig. 1                    Fig. 2

VEHICLE DEVICE HAVING A BASE VEHICLE AND A SEAT UNIT

The invention relates to a vehicle device comprising a base vehicle and at least one seat unit which is connected or connectable to the base vehicle according to the preamble of claim 1 and to a seat unit being adapted for being a part of such a vehicle device according to claim 11.

Vehicles with an adjustable seating system are known in the art. For example in many vans or minibuses single seats or seat benches can be mounted in different positions and/or orientations inside the base vehicle and/or can be removed completely from this base vehicle. For this purpose, the base vehicle is often equipped with seat mounting rails. According to the definitions chosen in this patent application a system comprising at least one such seat and the base vehicle (the vehicle without this seat) is called "vehicle device".

It is also known in the prior art to equip a vehicle seat with at least one sensor, especially with a seat occupancy sensor and a buckle sensor such that the ECU of the vehicle "knows" which vehicle seat is occupied with a person and if this person is belted or not. In case of traditional cars, in which each seat has a substantially fixed position, the sensor information can easily be transmitted by means of electric cables. A unit comprising "the seat as such", at least one sensor and an electronic unit for reading out said sensor—both being attached to the seat—is referred to as "seat unit" in this patent application.

The situation becomes more difficult in the above described case, meaning in the case of a vehicle device having a base vehicle and at least one vehicle seat which can be mounted into the base vehicle at different positions and/or different orientations or which can even be removed from the base vehicle completely. A "traditional cable connection" between the seat and the base vehicle is often not possible in this case. So, among others, the problem exists that without additional measures, the ECU does not "know" whether or not a vehicle seat is mounted and/or if the seat is occupied and/or if the seatbelt is used.

Starting from this prior art it is one object of the invention to provide a vehicle device having a base vehicle and at least one seat unit, such that the presence of the seat unit inside the base vehicle and the status of at least one sensor of this seat unit can be transmitted without the need of a cable-connection between the seat unit and the base vehicle.

This task is solved by a vehicle device having the features of claim 1.

The communication between the electronic control means of the base vehicle (usually the so called ECU) and the seat unit takes place wirelessly, such that the base vehicle comprises a vehicle-side wireless communication means and the seat unit comprises a seat-side wireless communication means adapted for wireless communication with the vehicle-side wireless communication means. Such wireless communication means usually comprise an antenna and related electronics as is of course known in the prior art.

Since it is desired that there is no permanent cable connection (or even more preferred no cable connection at all) between the seat unit and the base vehicle, the seat unit comprises a battery which supplies the electronic unit of the seat unit with electrical power.

The electrical unit comprises at least one read-out means for reading out at least one sensor of the seat unit, such that a sensor value can be transferred from the seat unit to the base vehicle by means of wireless communication. In principle it would be possible that the electronic unit reads-out the actual value from the at least one sensor with a certain frequency and transmits the actual value with the vehicle-side wireless communication means every time after the read-out, but in order to save electric energy and thus to prolong the time before the battery of the seat unit must be recharged or replaced, another possibility is chosen according to the invention:

As has been mentioned, the electronic unit of the base vehicle needs to know the present state ("present" usually means within a certain frequency) of the seat unit and this could of course be achieved by sending the status information with the desired frequency by means of a signal representing the actual value of the sensor from the seat unit to the base vehicle. But, the same information status in the electronic unit of the base vehicle can be achieved by sending a respective signal representing the value of the sensor only after this value has changed. Since the status of the seat unit changes only very rarely, the average number of signals representing the value of the sensor is dramatically reduced leading to a reduction of the average consumption of electric energy. Since only changes of the values are transmitted, one could say that a serial data-compression takes place. In order to be able to recognize a change of the value of the sensor, the electronic unit of the seat unit needs a storage means in which the latest value of the sensor is stored and a comparing means which compares this latest value with the actually measured value such that the electronic unit of the seat unit can detect a change in the sensor's status (its value) and send a signal representing the value of the sensor if such a change is detected. In order to be able to also detect the next change, the stored value is replaced by the actually measured value. So, the vehicle according to the invention comprises:

A base vehicle and a seat unit being releasably connectable to the base vehicle, wherein the base vehicle comprises an electronic control means and a vehicle-side wireless communication means connected to the electronic control means, and the seat unit comprises:

a seat element, a sensor, an electronic unit comprising:

(a) a timing means for generating time-spaced wake-up signals S(t), (b) a read-out means for reading out the sensor to retrieve values V(t) from the sensor, (c) a storage means, (d) a comparing means, (e) a seat-side wireless communication means adapted for wireless communication with the vehicle-side wireless communication means, and a battery for supplying the electronic unit with electrical power.

During operation—and this means usually during the whole lifetime of the seat unit—the read-out means reads out the actual value V(t) of the sensor after having received a wake-up signal S(t) and the comparing means compares this actual value V(t) with a stored value $V_s$ stored in the storage means. The seat-side wireless communications means sends out a signal representing the value only if the actual value V(t) is not identical to the stored value $V_s$ (meaning that something changed) and does not send out a sensor related signal if the actual value V(t) is identical to the stored value $V_s$. This means that a signal representing the value is sent out only very rarely which leads to the desired energy saving.

In order to detect the next change correctly, the value actual V(t) is stored as the new stored value $V_s$ if the actual value V(t) is not identical to the stored value $V_s$.

Preferably, the seat-side wireless communication means sends out an alive-signal other than the signal representing the value V(t) if no change is detected. Since such an alive-signal contains far less information than a sensor related signal, less energy is needed for its generation, but still the ECU of the main vehicle "knows" that the seat unit is mounted in the base vehicle and working.

As has already been mentioned, the electronic unit of the seat unit preferably has at least a first state ("sleep mode") and a second state ("awake mode"), wherein the electrical power consumption in the first state is less than in the second state. Each wake-up signal S(t) of the timing means brings the electronic unit from the first state into the second state and the electronic unit of the seat unit returns to its first state after having sent the alive-signal.

Often it will be preferred that the seat unit receives an acknowledgement from the base vehicle after having sent out a sensor related signal in order to make sure that the sensor related signal has been received. So, it is often preferred that the vehicle-side wireless communication means and the seat-side wireless communication means define a bi-directional communication path, for example in form of a Bluetooth-connection. In this connection one should keep in mind the following: The value of the sensor usually only changes when the seat unit is mounted in the base vehicle and used, which is usually the case far less than 95% of the time, and the base vehicle can only recognize a signal from the vehicle unit when it is operated (not parked) which is the usually the case less than 90% of the time. So, waiting for an acknowledgement signal also after having sent out an alive-signal would be a useless waste of energy for the seat unit and thus it is preferred that the base vehicle does not send out an acknowledgement signal to the seat unit after having received an alive-signal from the seat unit.

In order to maximize the time in which the seat unit is in its sleep-mode, it is further preferred that the electronic unit of the seat unit returns to its first state after having received the acknowledgement signal. In order to enhance the reliability of operation, it is further preferred that electronic unit of the seat unit re-sends the signal representing the value if not having revived an acknowledgment signal within a waiting time interval after having send out the previous signal representing the value. But, since it is possible that the sensor changes its value even if the seat unit is not mounted to the base vehicle (some can sit down on the seat while 20 the seat is stored in a garage), the number of re-sendings should be limited.

Figure 4:
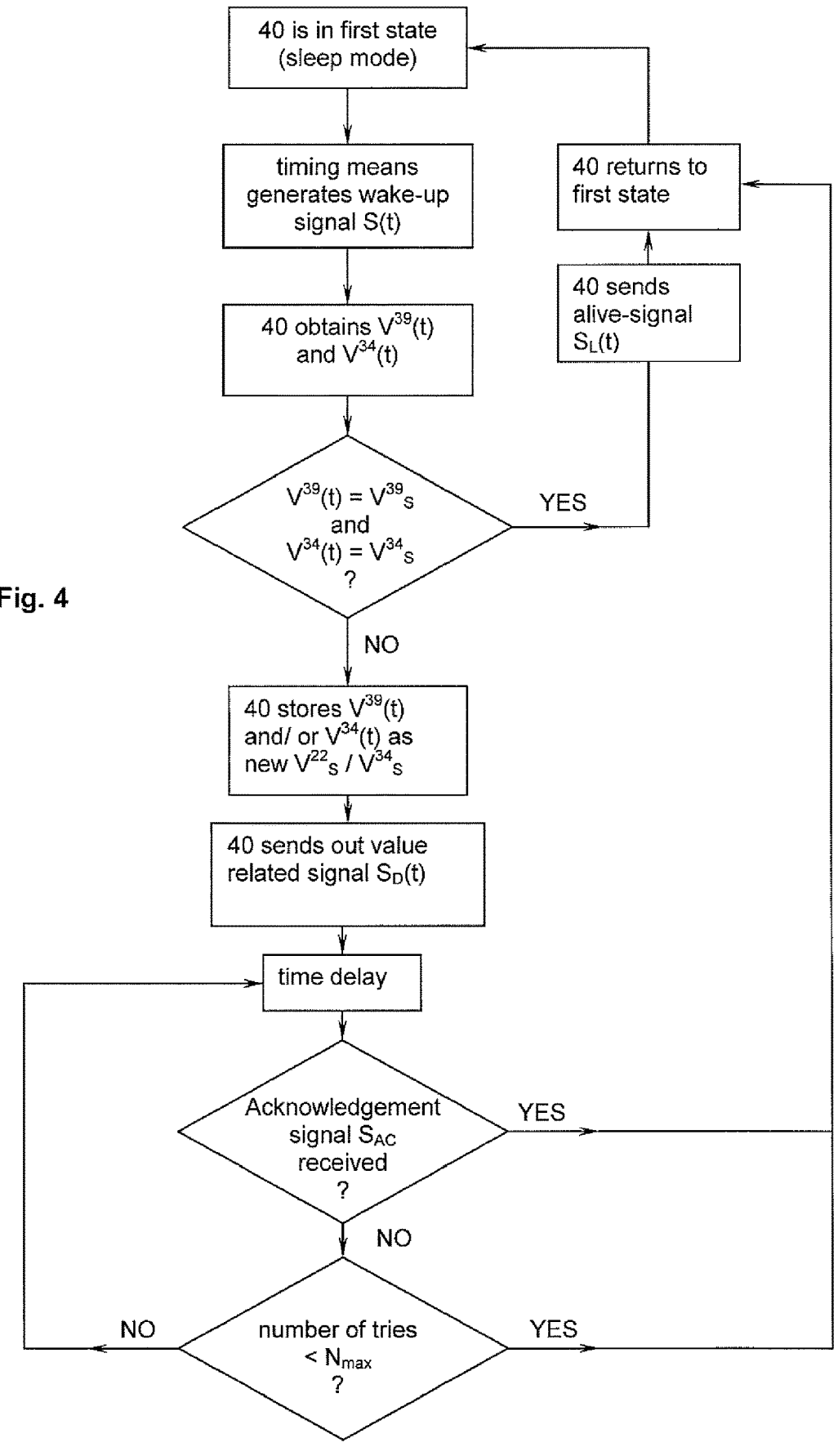

The invention will now be described in detail by means of a preferred embodiment in view of the figures. The figures show:

FIG. 1 a vehicle device according to the invention in a top view, wherein a roof of the base vehicle of the vehicle device is not shown, and wherein a seat unit of the vehicle device is remote from the base vehicle, FIG. 2 what is shown in FIG. 1 with the seat unit being mounted to the mounting rails of the base vehicle, FIG. 3 a schematic representation of the seat unit and the vehicle-side antenna, and FIG. 4 a flow chart showing an operation modus of the seat unit.

FIG. 1 shows a first embodiment of a vehicle device according to the invention. In terms of this patent application, this vehicle device comprises a base vehicle 10 and a seat unit 30 which can be attached to the base vehicle and be removed from it. In FIG. 1, the seat unit 30 is removed from the base vehicle 10. The base vehicle 10 is here in form of a van or a minibus and is provided with seat mounting rails 18 to which the seat unit 30 can be mounted. Since the detection of the position of a mounted seat unit is not in focus of this invention, the mounting of the seat unit to the base vehicle does not necessarily have to occur via a rails system, it would also be possible that there is only one dedicated position for the seat unit within the base vehicle.

According to the definitions chosen in this patent application, the seat unit 30 comprises the seat element, an electronic unit and a battery. In the embodiment shown, the electronic unit 30 comprises a controller 41 and a seat-side antenna 44. The controller 41 is of course connected to the battery 46 and the seat-side antenna 44 is of course also directly or indirectly provided with electric energy form the battery 46.

The base vehicle 10 comprises a vehicle-side antenna 24, which is at least indirectly connected to the ECU of the base vehicle (not shown in the figures). Both, the seat-side antenna 44 and the vehicle-side antenna 24 are transmitting and receiving antennas, such that a bi-directional, wireless communication path is established by those two antennas; of course both of those antennas could be split into a receiving and a transmitting antenna. The term "antenna" is to be understood broadly and comprises all means for sending/receiving an electromagnetic signal, but preferably the antennas operate in a frequency range between 100 MHz and 2.5 GHz.

FIG. 2 shows what is shown in FIG. 1 but with the seat unit 30 being mounted to the seat mounting rails 18 of the base vehicle 10, such that the antennas 24 and 44 can establish a bi-directional communication path.

FIG. 3 shows the relevant elements of the seat unit 30 as well as the vehicle-side antenna 24. The seat unit 30 comprises (or course) a seating 32 (since here the seat of the seat unit 30 is a three-person-bench, three seatings 32 are provided, but for simplicity, only one is shown), an electronic unit, a battery 46, as well as two sensors, namely a seat occupancy sensor 34 and a buckle sensor 39, both being connected to the controller 41 (of course other types of sensors could be present). According to the definitions chosen in this application, the seat-side antenna 44 and the controller 41 are parts of the electronic unit 40.

The controller is usually an integrated circuit but can functionally be looked at as comprising a timing means, a read out means for reading out the sensors to retrieve values from the sensors, a storage means for storing values, and a comparing means for comparing measured and stored values.

In view of the flow chart of FIG. 4 it is now described how this system works. At an (arbitrary) starting point, the electronic unit 40 is in a first state, also called "sleep-mode". As the word "sleep-mode" already says, in this first state the electronic unit has a minimized power consumption, such that it needs only very little energy from the battery, for example 10 μW. The timing means of the controller 41 generates a wake-up-signal S(t) at the time t, for example at a fixed time after the electronic unit 40 has changed to its first state (sleep-mode). For example, the wake-up-signal S(t) could be generated five seconds after the last transition into the first state. Of course, other time intervals could be chosen. After this wake-up-signal S(t) has been generated, the electronic unit 40 "awakes" and changes into its second state (active-mode), in which its power consumption is higher than in the first state.

Now that the controller 41 (and thus the electronic unit 40) is in its second state, its read-out means reads out the actual value $V^{39}(t)$ from the buckle sensor 39 and the actual value $V^{34}(t)$ from the seat occupancy sensor 34. In a next step, the actual value of the buckle sensor $V^{39}(t)$ is compared to a stored value $V^{39}s$ of the buckle sensor and the actual value $V^{34}(t)$ of the seat occupancy sensor is compared to a value $V^{34}s$ of the seat occupancy sensor.

If both actual values $V^{34}(t)$ and $V^{39}(t)$ are equal to their respective stored values $V^{34}s$ and $V^{39}s$, the electronic unit 40 only sends out an alive-signal SL(t) via its seat-side antenna 44 and then returns to its first state (sleep-mode). In this case the ECU of the base vehicle "knows", that the seat unit is mounted inside the base vehicle (otherwise it would not receive an alive-signal) and that its state has not changed since the last signal. So, the base vehicle has all necessary information about the seat unit.

But, if one of the actual values $V^{39}(t)/V^{34}(t)$ is not equal to its stored value $V^{34}s/V^{39}s$, this changed value is stored as the new stored value, such that the stored values $V^{34}s$ and $V^{39}s$ always correspond to the latest actual values. So, one could also say that the comparing means compares $V^{34}(t)$ with $V^{34}(t-1)$ and $V^{39}(t)$ with $V^{39}(t-1)$.

After at least one change has been found by the comparing means, the electronic unit 40 further sends out a value related signal So(t). This signal thus contains a "real" information, namely about the value of the respective sensor. In principal it would be possible, that the electronic unit 40 now returns to its first state, but in order to verify that this value related signal So(t) is received by the base vehicle, the base vehicle 10 generates an acknowledgement signal SAC after having received the value related signal So(t). The electronic unit 40 waits for this acknowledgement signal SAC and returns to the first state after having received it. If this acknowledgment signal is not received after a defined time interval, the value related signal So(t) is re-sent and the electronic unit 40 again waits for the acknowledgement signal. This sub-loop is repeated for a maximum number of tries and when the electronic unit 40 returns to its first state, even if no acknowledgement signal is received. This is necessary, because it could happen that something is placed onto the seat unit of a not mounted seat unit (for example while standing in a garage) and if the number of the transmission tries were not limited, the seat unit would stay in its second state (active mode) "forever" and would thus consume more energy than necessary.

It should be noted, that providing a bi-directional system as described above is preferred but that the basic concept could also be applied to a uni-directional system with the seat-side antenna being a transmitting antenna and the vehicle-side antenna being a receiving antenna.

LIST OF REFERENCE NUMBERS

10 base vehicle
12 driver's seat
14 front passenger seat
16 windscreen
18 seat mounting rail
24 vehicle-side antenna
30 seat unit
32 seating
34 seat occupancy sensor
35 seatbelt
36 tongue
38 buckle
39 buckle sensor

40 electronic unit
41 controller
44 seat-side antenna
46 battery

The invention claimed is:

1. A vehicle device comprising:
a base vehicle and a seat unit being releasably connectable to the base vehicle, wherein the base vehicle comprises an electronic control means and a vehicle-side wireless communication means connected to the electronic control means, and the seat unit comprises:
a seat element;
a sensor;
an electronic unit comprising:
  (a) a timing means for generating time-spaced wake-up signals S(t);
  (b) a read-out means for reading out the sensor to retrieve values V(t) from the sensor;
  (c) a storage means;
  (d) a comparing means;
  (e) a seat-side wireless communication means adapted for wireless communication with the vehicle-side wireless communication means; and,
a battery for supplying the electronic unit with electrical power, wherein:
  (i) the read-out means according to (b) reads out the value V(t) after having received a wake-up signal S(t) according to (a);
  (ii) the comparing means according to (d) compares the value V(t) according to (i) with a stored value $V_s$ stored in the storage means according to (c);
  (iii) the seat-side wireless communications means according to (e) sends out a signal representing the value V(t) if $V(t) \neq V_s$ and sends out an alive-signal other than the signal representing the value V(t) if $V(t) = V_s$; wherein the alive-signal is distinct from any sensor-related signal, the base vehicle does not send an acknowledgement in response to the alive-signal, and the electronic unit immediately returns to a first state (sleep mode) after transmitting the alive-signal; and,
  (iv) the value V(t) is stored as the new stored value $V_s$ if $V(t) \neq V_s$.

2. The vehicle device according to claim 1, wherein the electronic unit of the seat unit has in addition to the first state (sleep mode) at least a a second state (awake mode), wherein the electrical power consumption in the first state is less than in the second state, and each wake-up signal S(t) of the timing means brings the electronic unit from the first state into the second state.

3. The vehicle device according to claim 1, wherein the electronic unit of the seat unit returns to its first state after having sent the alive-signal.

4. The vehicle device according to claim 1, wherein the vehicle-side wireless communication means and the seat-side wireless communication means define a bi-directional communication path.

5. The vehicle device according to claim 4, wherein the base vehicle sends out an acknowledgement signal to the seat unit after having received a signal according to (iv) from the seat unit.

6. The vehicle device according to claim 5, wherein the base vehicle does not send out an acknowledgement signal to the seat unit after having received an alive-signal from the seat unit.

7. The vehicle device according to claim 6, wherein the electronic unit of the seat unit returns to its first state after having received the acknowledgement signal.

8. The vehicle device according to claim 7, wherein the electronic unit of the seat unit re-sends the signal according to (iii) if not having revived an acknowledgment signal within a waiting time interval after having send out the previous signal according to (iii).

9. The vehicle device according to claim 8, wherein the electronic unit returns to its first state if not having received an acknowledge signal after having send a predetermined number of signals according to (iii).

10. The vehicle device according to claim 1, wherein the timing means generates a wake-up signal after a resting-time that starts when the electronic unit has transferred from its second state to its first state.

11. The seat unit adapted for being a part of a vehicle device according to claim 1 and comprising:

a seat element;

a sensor;

an electronic unit comprising:

(a) a timing means for generating time-spaced wake-up signals S(t);

(b) a read-out means for reading out the sensor to retrieve values V(t) from the sensor;

(c) a storage means;

(d) a comparing means;

(e) a seat-side wireless communication means adapted for wireless communication with the vehicle-side wireless communication means; and, a battery for supplying the electronic unit with electrical power, wherein;

(i) the read-out means according to (b) reads out the value V(t) after having received a wake-up signal S(t) according to (a);

(ii) the comparing means according to (d) compares the value V(t) according to (i) with a stored value $V_s$ stored in the storage means according to (c);

(iii) the seat-side wireless communications means according to (e) sends out a signal representing the value V(t) if $V(t) \neq V_s$ and sends out an alive-signal other than the signal representing the value V(t) if $V(t) = V_s$; wherein the alive-signal is distinct from any sensor-related signal, the base vehicle does not send an acknowledgement in response to the alive-signal, and the electronic unit immediately returns to a first state (sleep mode) after transmitting the alive-signal; and, (iv) the value V(t) is stored as the new stored value $V_s$ if $V(t) \neq V_s$.

\* \* \* \* \*